United States Patent
Chen et al.

(10) Patent No.: US 8,890,784 B2
(45) Date of Patent: Nov. 18, 2014

(54) METHOD FOR SPEEDING UP ROTATION OF LIQUID CRYSTAL MOLECULE AND LIQUID CRYSTAL PANEL DRIVE CIRCUIT USED IN THE METHOD

(71) Applicant: Shenzhen China Star Optoelectronics Technology Co., Ltd., Guangdong (CN)

(72) Inventors: Yinhung Chen, Shenzhen (CN); Xia Tian, Shenzhen (CN); Pei Jia, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 135 days.

(21) Appl. No.: 13/805,660

(22) PCT Filed: Nov. 6, 2012

(86) PCT No.: PCT/CN2012/084109
§ 371 (c)(1),
(2), (4) Date: Dec. 20, 2012

(87) PCT Pub. No.: WO2014/063388
PCT Pub. Date: May 1, 2014

(65) Prior Publication Data
US 2014/0111722 A1   Apr. 24, 2014

(30) Foreign Application Priority Data

Oct. 22, 2012 (CN) .......................... 2012 1 0404180

(51) Int. Cl.
*G09G 3/36* (2006.01)
*G02F 1/133* (2006.01)
(52) U.S. Cl.
CPC ............ *G02F 1/13306* (2013.01); *G02F 1/133* (2013.01)
USPC ............................................................ 345/92
(58) Field of Classification Search
USPC ................................................... 345/204, 92
See application file for complete search history.

(56) References Cited

U.S. PATENT DOCUMENTS

| 8,009,133 | B2 | 8/2011 | You |
| 2008/0062103 | A1* | 3/2008 | You ................................ 345/89 |
| 2011/0122167 | A1* | 5/2011 | Kim et al. ..................... 345/690 |

FOREIGN PATENT DOCUMENTS

| CN | 101714338 A | 5/2010 |
| CN | 102034443 A | 4/2011 |
| JP | 2008151835 A | 7/2008 |

* cited by examiner

*Primary Examiner* — Jonathan Boyd
(74) *Attorney, Agent, or Firm* — Andrew C. Cheng

(57) ABSTRACT

The present invention provides a method for speeding up rotation of liquid crystal molecule and a liquid crystal panel drive circuit used in the method. The method includes providing a liquid crystal display device, which includes a glass substrate having a liquid crystal panel drive circuit formed thereon and including a timing controller and pixel units each including a thin-film transistor, a common electrode, a pixel electrode electrically connected to the thin-film transistor, a compensation unit, and a storage capacitor, the compensation unit including a compensation capacitor, the timing controller being electrically connected to the compensation unit and the pixel electrode; calculating discharging/charging time of the compensation capacitor; activating the liquid crystal display device, where the source driver applies a drive voltage via the thin-film transistor to the pixel electrode; and the timing controller controlling the compensation unit to conduct on or cut off according to the drive voltage.

5 Claims, 4 Drawing Sheets

| providing a liquid crystal display device, wherein the liquid crystal display device comprises: a glass substrate, a color filter arranged parallel to the glass substrate, and a quid crystal material arranged between the glass substrate and the color filter, the liquid crystal material comprising liquid crystal molecules and a photo- or thermal-polymerizable polymer; and the glass substrate comprises a liquid crystal panel drive circuit formed thereon, the liquid crystal panel drive circuit comprising: a gate driver, a source driver, a timing controller, a plurality of gate lines and a plurality of data lines, the plurality of gate lines and the data line defining a plurality of pixel units, each of the pixel units comprising a thin-film transistor, a common electrode, a pixel electrode electrically connected to the thin-film transistor, a compensation unit, and a storage capacitor, the thin-film transistor being respectively and electrically connected to the gate driver and the source driver via the gate lines and the data lines, the common electrode and the pixel electrode forming a liquid crystal capacitor, the storage capacitor being connected in parallel to the liquid crystal capacitor, the compensation unit having an end electrically connected to the pixel electrode, the compensation unit comprising: a compensation capacitor, an electrical switch, and an electrical inductor, the compensation capacitor having an end connected to the pixel electrode and an opposite end electrically connected to the electrical switch, the electrical switch having another end electrically connected to the electrical inductor, whereby the compensation unit, once conducted on, electrically charges the compensation capacitor, the timing controller being electrically connected to the compensation unit and the pixel electrode |
|---|

| calculating charging/discharging time of the compensation capacitor according to parameters of the compensation capacitor and the formula t=RC*ln[(V1-V0)/(V1-Vt)], in which R is equivalent resistance, C is capacitance, V1 is the final voltage level of the charging or discharging operation of the capacitor, Vt is the voltage level of the capacitor at the time t, and V0 is initial voltage level of the capacitor |
|---|

| activating the liquid crystal display device, wherein the source driver applies, via the thin-film transistor, the drive voltage to the pixel electrode, the drive voltage being applied to drive the liquid crystal molecules to rotate, the drive voltage comprising a plurality of high levels that is not all identical and a plurality of low levels that is not all identical |
|---|

| the timing controller controlling conduction of he compensation unit at the time that is spaced from a falling edge of each high level or a rising edge of low level by the charging time of the compensation capacitor according to the drive voltage of the pixel electrode of Step (3), the compensation unit discharging after being charged, and also controlling cutoff of the compensation unit after lapse of the discharging time of the compensation capacitor according to the drive voltage of the pixel electrode |
|---|

Fig. 3

METHOD FOR SPEEDING UP ROTATION OF LIQUID CRYSTAL MOLECULE AND LIQUID CRYSTAL PANEL DRIVE CIRCUIT USED IN THE METHOD

BACKGROUND OF THE INVENTION

1. Field of the Invention

The present invention relates to the field of liquid crystal display, and in particular to a method for speeding up rotation of liquid crystal molecule and a liquid crystal panel drive circuit used in the method.

2. The Related Arts

A liquid crystal display is a displaying device that comprises two parallel glass substrates that are opposite to each other and liquid crystal molecules arranged between the two substrates, wherein electrical excitation is applied to use anisotropy to effect switching of light. By means of the anisotropy of refraction of liquid crystal molecule, application of electrical voltage to the liquid crystal molecule to redefine refraction anisotropic axis may control the luminance of transmitting light of liquid crystal molecule.

Liquid crystal material used in a vertical alignment (VA) liquid crystal display device is generally liquid crystal molecule having negative dielectric anisotropy. Without application of electricity, the liquid crystal molecules are aligned in a direction that is substantially perpendicular to glass substrates. When an electrical voltage is applied, the liquid crystal molecules start to rotate along a vertical axis and the maximum rotation may reach being parallel with the glass substrates.

When the liquid crystal molecules are perpendicular to the glass substrates, the transmittance thereof is generally zero and displaying is darkest in a normal black mode. When the liquid crystal molecules are parallel with the glass substrates, the transmittance thereof is the maximum and displaying is brightest in the normal black mode. However, in a practical application, such a liquid crystal displaying manner often suffers an phenomenon of extension of response time for conversion from black to halftone, which are typically conversion from black to low luminance halftone, conversion from black to high luminance halftone, and conversion from black to white and then conversion back to black.

The primary factor that causes the extension of response time of a liquid crystal display device for conversion from black to halftone is that the rotational speed and the rotational angle of the liquid crystal molecule are determined by the magnitude of drive voltage applied thereto. However, in the halftone conversion process, since the drive voltage that drives the rotation of the liquid crystal molecule is relatively small, the rotational speed of the liquid crystal molecule is slow and an extended response time may thus result.

In view of the above problems, a known solution is to increase the drive voltage in order to increase the rotational speed of the liquid crystal molecule and thus shorten the response time. However, increasing drive voltage may result in an abrupt rise of transmittance, followed by a rapid drop, when the liquid crystal display device is converted from a bright condition to a dark condition, and no smooth transition may apply. Referring to FIG. 1, a drive voltage applied to a pixel electrode comprises a plurality of high levels Vp1 that may not be all identical and a plurality of low levels Vp2 that may not be all identical. The absolute value of the difference between adjacent high level and low level is ΔV. Referring to FIG. 2, when the ratio Vp1/Vp2 gets large, ΔV is large, so that the instantaneous change of transmittance is relatively large, making it purge that causes flicking of the liquid crystal display screen.

SUMMARY OF THE INVENTION

An object of the present invention is to provide a method for speeding up rotation of liquid crystal molecule so as to shorten the response time of liquid crystal molecule and, meanwhile, to provide a smooth transition from black to halftone for a liquid crystal display device applying the method thereby avoid abrupt change of transmittance and improve the quality of the liquid crystal display device applying the method.

Another object of the present invention is to provide a liquid crystal panel drive circuit, which increases rotation and restoration speeds of liquid crystal molecules, shortens response time, makes a smooth process of transition from black to halftone, avoids abrupt change of transmittance, and enhances quality of the liquid crystal display device using the circuit.

To achieve the object, the present invention provides a method for speeding up rotation of liquid crystal molecule, which comprises the following steps:

(1) providing a liquid crystal display device, wherein the liquid crystal display device comprises: a glass substrate, a color filter arranged parallel to the glass substrate, and a quid crystal material arranged between the glass substrate and the color filter, the liquid crystal material comprising liquid crystal molecules and a photo- or thermal-polymerizable polymer; and the glass substrate comprises a liquid crystal panel drive circuit formed thereon, the liquid crystal panel drive circuit comprising: a gate driver, a source driver, a timing controller, a plurality of gate lines and a plurality of data lines, the plurality of gate lines and the data line defining a plurality of pixel units, each of the pixel units comprising a thin-film transistor, a common electrode, a pixel electrode electrically connected to the thin-film transistor, a compensation unit, and a storage capacitor, the thin-film transistor being respectively and electrically connected to the gate driver and the source driver via the gate lines and the data lines, the common electrode and the pixel electrode forming a liquid crystal capacitor, the storage capacitor being connected in parallel to the liquid crystal capacitor, the compensation unit having an end electrically connected to the pixel electrode, the compensation unit comprising: a compensation capacitor, an electrical switch, and an electrical inductor, the compensation capacitor having an end connected to the pixel electrode and an opposite end electrically connected to the electrical switch, the electrical switch having another end electrically connected to the electrical inductor, whereby the compensation unit, once conducted on, electrically charges the compensation capacitor, the timing controller being electrically connected to the compensation unit and the pixel electrode;

(2) calculating charging/discharging time of the compensation capacitor according to parameters of the compensation capacitor and the formula $t=RC*\ln[(V1-V0)/(V1-Vt)]$, in which R is equivalent resistance, C is capacitance, V1 is the final voltage level of the charging or discharging operation of the capacitor, Vt is the voltage level of the capacitor at the time t, and V0 is initial voltage level of the capacitor;

(3) activating the liquid crystal display device, wherein the source driver applies, via the thin-film transistor, the drive voltage to the pixel electrode, the drive voltage being applied to drive the liquid crystal molecules to rotate, the drive voltage comprising a plurality of high levels that is not all identical and a plurality of low levels that is not all identical; and (4) the timing controller controlling conduction of the compensation unit at the time that is spaced from a falling edge of each high level or a rising edge of low level by the charging time of the compensation capacitor according to the drive voltage of the pixel electrode of Step (3), the compensation unit discharging after being charged, and also controlling cutoff of the compensation unit after lapse of the discharging time of the compensation capacitor according to the drive voltage of the pixel electrode.

The thin-film transistor comprises: a source terminal, a gate terminal, and a drain terminal. The source terminal is electrically connected via the data line to the source driver.

The gate terminal of the thin-film transistor is electrically connected via the gate line to the gate driver. The drain terminal of the thin-film transistor is electrically connected to the pixel electrode.

The compensation capacitor has capacitance that is less than sum of capacitances of the storage capacitor and the liquid crystal capacitor.

The present invention also provides a liquid crystal panel drive circuit, which comprises: a gate driver, a source driver, a timing controller, a plurality of gate lines and a plurality of data lines. The plurality of gate lines and the data line define a plurality of pixel units. Each of the pixel units comprises a thin-film transistor, a common electrode, a pixel electrode electrically connected to the thin-film transistor, a compensation unit, and a storage capacitor. The thin-film transistor is respectively and electrically connected to the gate driver and the source driver via the gate lines and the data lines. The common electrode and the pixel electrode form a liquid crystal capacitor. The storage capacitor is connected in parallel to the liquid crystal capacitor. The compensation unit has an end electrically connected to the pixel electrode. The timing controller is electrically connected to the compensation unit and the pixel electrode.

The compensation unit comprises: a compensation capacitor, an electrical switch, and an electrical inductor. The compensation capacitor has an end connected to the pixel electrode and an opposite end electrically connected to the electrical switch. The electrical switch has another end electrically connected to the electrical inductor, whereby the compensation unit, once conducted on, electrically charges the compensation capacitor.

The thin-film transistor comprises: a source terminal, a gate terminal, and a drain terminal. The source terminal is electrically connected via the data line to the source driver.

The gate terminal of the thin-film transistor is electrically connected via the gate line to the gate driver. The drain terminal of the thin-film transistor is electrically connected to the pixel electrode.

The compensation capacitor has capacitance that is less than sum of capacitances of the storage capacitor and the liquid crystal capacitor.

The present invention further provides a method for speeding up rotation of liquid crystal molecule, which comprises the following steps:

(1) providing a liquid crystal display device, wherein the liquid crystal display device comprises: a glass substrate, a color filter arranged parallel to the glass substrate, and a quid crystal material arranged between the glass substrate and the color filter, the liquid crystal material comprising liquid crystal molecules and a photo- or thermal-polymerizable polymer; and the glass substrate comprises a liquid crystal panel drive circuit formed thereon, the liquid crystal panel drive circuit comprising: a gate driver, a source driver, a timing controller, a plurality of gate lines and a plurality of data lines, the plurality of gate lines and the data line defining a plurality of pixel units, each of the pixel units comprising a thin-film transistor, a common electrode, a pixel electrode electrically connected to the thin-film transistor, a compensation unit, and a storage capacitor, the thin-film transistor being respectively and electrically connected to the gate driver and the source driver via the gate lines and the data lines, the common electrode and the pixel electrode forming a liquid crystal capacitor, the storage capacitor being connected in parallel to the liquid crystal capacitor, the compensation unit having an end electrically connected to the pixel electrode, the compensation unit comprising: a compensation capacitor, an electrical switch, and an electrical inductor, the compensation capacitor having an end connected to the pixel electrode and an opposite end electrically connected to the electrical switch, the electrical switch having another end electrically connected to the electrical inductor, whereby the compensation unit, once conducted on, electrically charges the compensation capacitor, the timing controller being electrically connected to the compensation unit and the pixel electrode;

(2) calculating charging/discharging time of the compensation capacitor according to parameters of the compensation capacitor and the formula $t=RC*\ln[(V1-V0)/(V1-Vt)]$, in which R is equivalent resistance, C is capacitance, V1 is the final voltage level of the charging or discharging operation of the capacitor, Vt is the voltage level of the capacitor at the time t, and V0 is initial voltage level of the capacitor;

(3) activating the liquid crystal display device, wherein the source driver applies, via the thin-film transistor, the drive voltage to the pixel electrode, the drive voltage being applied to drive the liquid crystal molecules to rotate, the drive voltage comprising a plurality of high levels that is not all identical and a plurality of low levels that is not all identical; and (4) the timing controller controlling conduction of the compensation unit at the time that is spaced from a falling edge of each high level or a rising edge of low level by the charging time of the compensation capacitor according to the drive voltage of the pixel electrode of Step (3), the compensation unit discharging after being charged, and also controlling cutoff of the compensation unit after lapse of the discharging time of the compensation capacitor according to the drive voltage of the pixel electrode; and wherein the thin-film transistor comprises: a source terminal, a gate terminal, and a drain terminal, the source terminal being electrically connected via the data line to the source driver;

wherein the gate terminal of the thin-film transistor is electrically connected via the gate line to the gate driver, the drain terminal of the thin-film transistor being electrically connected to the pixel electrode; and wherein the compensation capacitor has capacitance that is less than sum of capacitances of the storage capacitor and the liquid crystal capacitor.

The efficacy of the present invention is that the present invention provides a method for speeding up rotation of liquid crystal molecule, which makes compensation on the drive voltage of a pixel electrode by arranging a compensation capacitor so as to make the waveform of the drive voltage of the pixel electrode smoother and avoid abruption change of transmittance, whereby a liquid crystal display device uses such a method can have a smooth transition from black to halftone and can also increase the drive voltage, shorten response time, and enhance quality of the liquid crystal display device. A liquid crystal panel drive circuit according to the present invention increases rotation and restoration speeds of the liquid crystal molecules, shortens response time, makes a smooth process of transition from black to halftone, avoids abrupt change of transmittance, and enhances quality of the liquid crystal display device.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, of the present invention will be apparent from the following detailed description of an embodiment of the present invention, with reference to the attached drawings. In the drawings:

FIG. 3 is a flow chart illustrating a method for speeding up rotation of liquid crystal molecule according to the present invention;

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
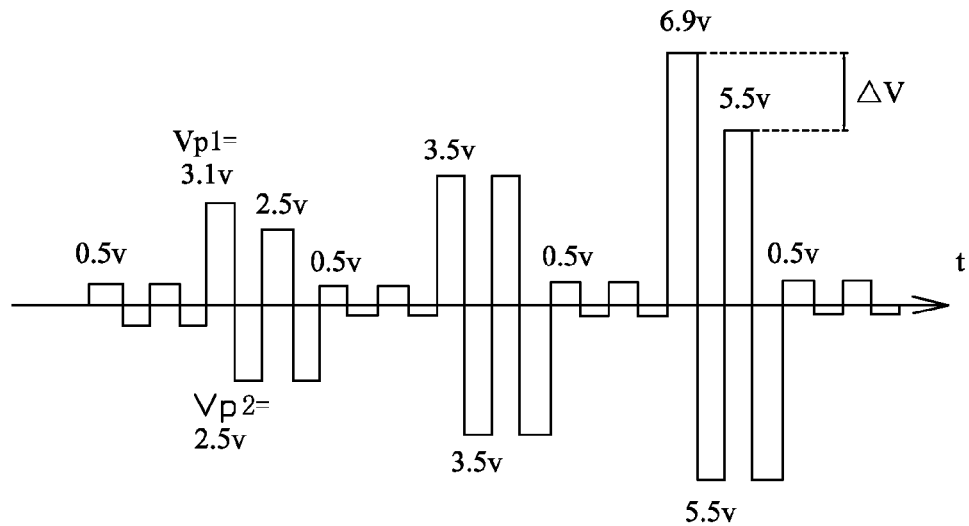
FIG. 1 is a waveform diagram of drive voltage of a pixel electrode of the prior art.
Figure 2:
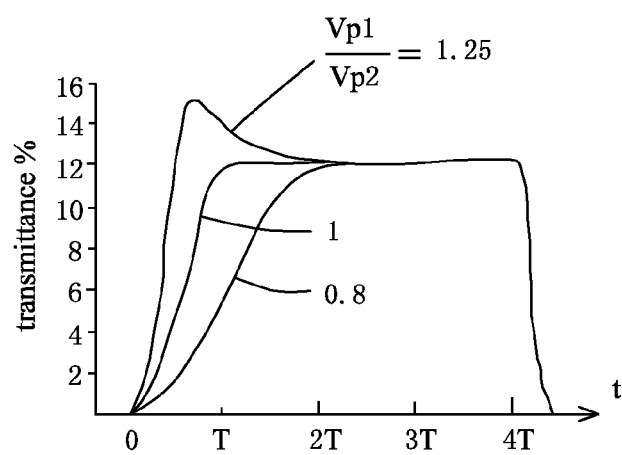
FIG. 2 is a plot showing variation of transmittance with respect to Vp1/Vp2 of the prior art.
Figure 4:
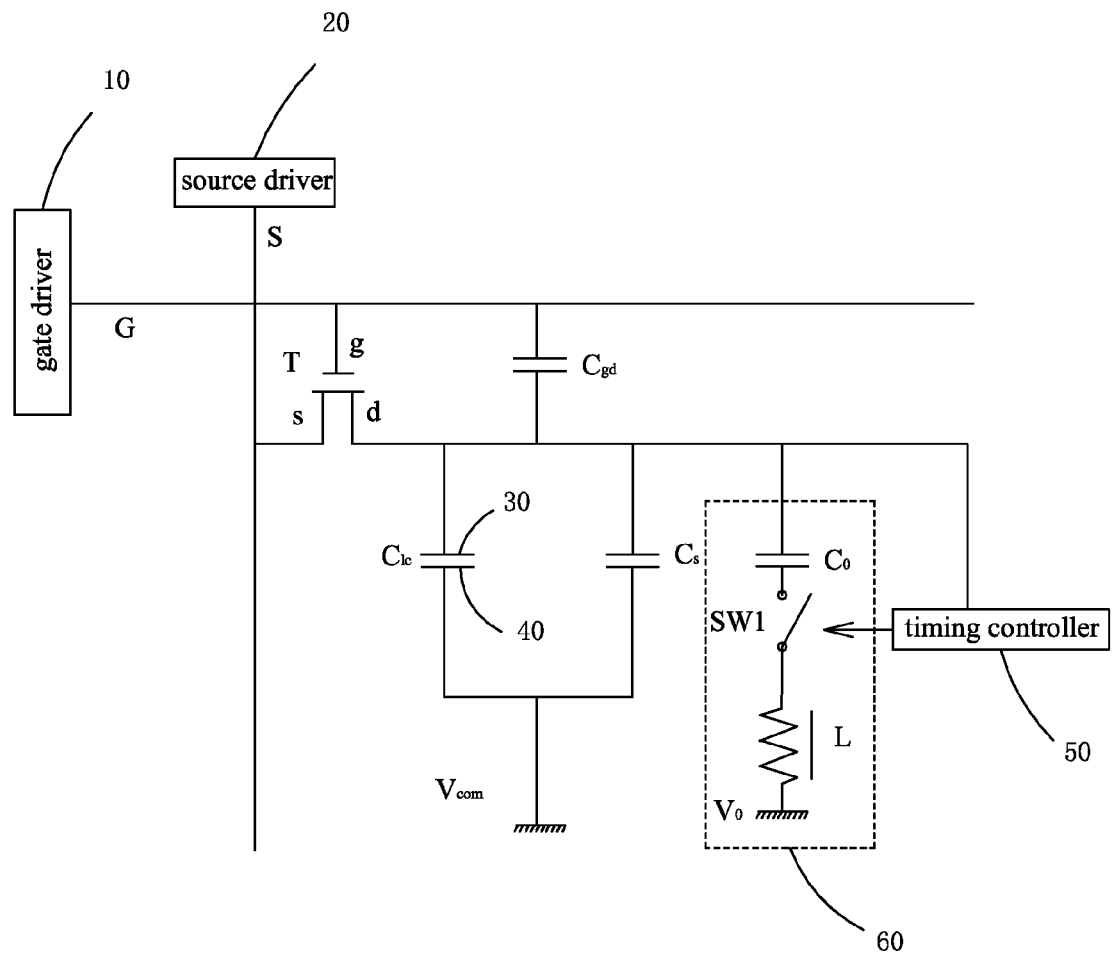
FIG. 4 is a schematic view showing a pixel unit circuit of a liquid crystal panel drive circuit used in the method for speeding up rotation of liquid crystal molecule according to the present invention.
Figure 5:
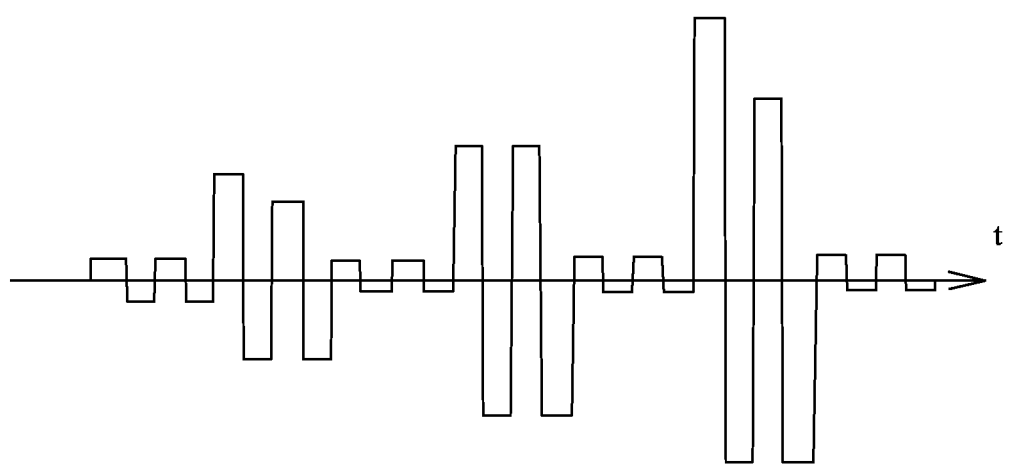
FIG. 5 is a waveform diagram of drive voltage of a pixel electrode according to the present invention.

Referring to FIGS. 3-5, the present invention provides a method for speeding up rotation of liquid crystal molecule, which comprises the following steps:

Step 1: providing a liquid crystal display device, wherein the liquid crystal display device comprises: a glass substrate, a color filter arranged parallel to the glass substrate, and a quid crystal material arranged between the glass substrate and the color filter, the liquid crystal material comprising liquid crystal molecules and a photo- or thermal-polymerizable polymer (both not shown); and the glass substrate comprises a liquid crystal panel drive circuit formed thereon, the liquid crystal panel drive circuit comprising: a gate driver 10, a source driver 20, a timing controller 50, a plurality of gate lines G(j) and a plurality of data lines S(i), the plurality of gate lines G(j) and the data line S(i) defining a plurality of pixel units, each of the pixel units comprising a thin-film transistor T, a common electrode 40, a pixel electrode 30 electrically connected to the thin-film transistor T, a compensation unit 60, and a storage capacitor Cs, the thin-film transistor T being respectively and electrically connected to the gate driver 10 and the source driver 20 via the gate lines G(j) and the data lines S(i), the common electrode 40 and the pixel electrode 30 forming a liquid crystal capacitor $C_{lc}$, the storage capacitor Cs being connected in parallel to the liquid crystal capacitor $C_{lc}$, the compensation unit 60 having an end electrically connected to the pixel electrode 30 and an opposite end having a voltage level lower than voltage level of the common electrode 40, the timing controller 50 being electrically connected to the compensation unit 60 and the pixel electrode 30.

The plurality of data lines S(1), S(2), ..., S(i) constitutes a data bus structure S. The plurality of gate lines G(1), G(2), ..., G(j) constitutes a gate bus structure G. The data bus structure S and the gate bus structure G collectively drive the pixel electrodes 30.

The compensation unit 60 comprises: a compensation capacitor $C_0$, an electrical switch SW1, and an electrical inductor L. The compensation capacitor $C_0$ has an end connected to the pixel electrode 30 and an opposite end electrically connected to the electrical switch SW1. The electrical switch SW1 has another end electrically connected to the electrical inductor L. The compensation unit 60, once conducted on, electrically charges the compensation capacitor $C_0$. After completion of the changing, when the polarity of the drive voltage of the pixel electrode 30 is changed, the compensation capacitor $C_0$ discharges to effect voltage compensation for the pixel electrode 30 so as to make a smoother transition of the drive voltage of the pixel electrode 30. The electrical inductor L slows down the charging and discharging process of the compensation capacitor $C_0$ so as to better smoothen the transition of the drive voltage of the pixel electrode 30. The compensation capacitor $C_0$ has a capacitance that is less than the sum of the capacitances of the storage capacitor Cs and the liquid crystal capacitor $C_{lc}$ and a rating voltage that is less than the smallest drive voltage required by the pixel electrode 30 for the liquid crystal display device to display halftone.

The thin-film transistor T comprises: a source terminal s, a gate terminal g, and a drain terminal d. The source terminal s is electrically connected via the data line S(i) to the source driver 20. The gate terminal g of the thin-film transistor T is electrically connected via the gate line G(i) to the gate driver 10. The drain terminal d of the thin-film transistor T is electrically connected to the pixel electrode 30.

Step 2: calculating charging/discharging time t of the compensation capacitor according to parameters of the compensation capacitor $C_0$ and the formula $t=RC*\ln[(V1-V0)/(V1-Vt)]$.

The charging/discharging time t is calculated with the following formula: $t=RC*\ln[(V1-V0)/(V1-Vt)]$, in which R is equivalent resistance, C is capacitance, V1 is the final voltage level of the charging or discharging operation of the capacitor, Vt is the voltage level of the capacitor at the time t, and V0 is initial voltage level of the capacitor. With V1 being the rating voltage of the compensation capacitor $C_0$, the time t that the compensation capacitor $C_0$ is completely charged or discharged in the circuit can be calculated.

Step 3: activating the liquid crystal display device, wherein the source driver 20 applies, via the thin-film transistor T, the drive voltage to the pixel electrode 30, the drive voltage being applied to drive the liquid crystal molecules to rotate, the drive voltage comprising a plurality of high levels that is not all identical and a plurality of low levels that is not all identical.

The drive voltage comprises a plurality of high/low levels to drive the liquid crystal molecules to rotate to different extents so as to control the luminance and color of the liquid crystal display device. In the instant embodiment, the sustaining duration of each high/low level is $T_0$, which satisfies $t<T_0-t$.

Step 4: the timing controller 50 controlling conduction of he compensation unit 60 at the time that is spaced from a falling edge of each high level or a rising edge of low level by the charging time of the compensation capacitor $C_0$ according to the drive voltage of the pixel electrode 30 of Step 3, the compensation unit 60 discharging after being charged, and also controlling cutoff of the compensation unit 60 after lapse of the discharging time of the compensation capacitor $C_0$ according to the drive voltage of the pixel electrode 30.

The timing controller 50 is electrically connected to the pixel electrode 30, whereby when the drive voltage of the pixel electrode 30 changes, such as changing from high level to low level or from low level to high level, the timing controller 50 is triggered to start time counting and conducts the compensation unit 60 on at time $T_0-t$ to charge the compensation capacitor $C_0$. Afterwards, when the drive voltage of the pixel electrode 30 changes again, the timing controller 50 starts time counting and cuts off the compensation unit 60 at time t and further conducts the compensation unit 60 on at time $T_0-t$ so as to repeat the operation on the compensation capacitor $C_0$.

The timing controller 50 controls the compensation capacitor $C_0$ to discharge at the time when the drive voltage of the pixel electrode 30 changes from high level to low level or from low level to high level so as to smoothen abrupt change of the drive voltage of the pixel electrode 30. After the discharging of the compensation capacitor $C_0$ is completed, the timing controller 50 controls the electrical switch to open so as to cut off the compensation unit 60.

It is noted that applying the method to drive the liquid crystal molecules to rotate can also increase the drive voltage of the pixel electrode 30 so as to further speed up the rotation of the liquid crystal molecules and shorten the response time.

Referring to FIGS. 4 and 5, the present invention also provides a liquid crystal panel drive circuit, which comprises: a gate driver 10, a source driver 20, a timing controller 50, a plurality of gate lines G(j) and a plurality of data lines S(i), the plurality of gate lines G(j) and the data line S(i) defining a plurality of pixel units, each of the pixel units comprising a thin-film transistor T, a common electrode 40, a pixel electrode 30 electrically connected to the thin-film transistor T, a compensation unit 60, and a storage capacitor Cs, the thin-film transistor T being respectively and electrically connected to the gate driver 10 and the source driver 20 via the gate lines G(j) and the data lines S(i), the common electrode 40 and the pixel electrode 30 forming a liquid crystal capacitor $C_{lc}$, the storage capacitor Cs being connected in parallel to the liquid crystal capacitor $C_{lc}$, the compensation unit 60 having an end electrically connected to the pixel electrode 30 and an opposite end having a voltage level lower than voltage level of the common electrode 40, the timing controller 50 being electrically connected to the compensation unit 60 and the pixel electrode 30.

The plurality of data lines S(1), S(2), ..., S(i) constitutes a data bus structure S. The plurality of gate lines G(1), G(2), ..., G(j) constitutes a gate bus structure G. The data bus structure S and the gate bus structure G collectively drive the pixel electrodes 30.

The compensation unit 60 comprises: a compensation capacitor $C_0$, an electrical switch SW1, and an electrical inductor L. The compensation capacitor $C_0$ has an end connected to the pixel electrode 30 and an opposite end electrically connected to the electrical switch SW1. The electrical switch SW1 has another end electrically connected to the electrical inductor L. The compensation unit 60, once conducted on, electrically charges the compensation capacitor $C_0$. After completion of the changing, when the polarity of the drive voltage of the pixel electrode 30 is changed, the compensation capacitor $C_0$ discharges to effect voltage compensation for the pixel electrode 30 so as to make a smoother transition of the drive voltage of the pixel electrode 30. The electrical inductor L slows down the charging and discharging process of the compensation capacitor $C_0$ so as to better smoothen the transition of the drive voltage of the pixel electrode 30. The compensation capacitor $C_0$ has a capacitance that is less than the sum of the capacitances of the storage capacitor Cs and the liquid crystal capacitor $C_{lc}$ and a rating voltage that is less than the smallest drive voltage required by the pixel electrode 30 for the liquid crystal display device to display halftone.

The charging/discharging time t is calculated with the following formula: $t=RC*\ln[(V1-V0)/(V1-Vt)]$, in which R is equivalent resistance, C is capacitance, V1 is the final voltage level of the charging or discharging operation of the capacitor, Vt is the voltage level of the capacitor at the time t, and V0 is initial voltage level of the capacitor. With V1 being the rating voltage of the compensation capacitor $C_0$, the time t that the compensation capacitor $C_0$ is completely charged or discharged in the circuit can be calculated. The drive voltage applied to the pixel electrode 30 comprises a plurality of high/low levels to drive the liquid crystal molecules to rotate to different extents so as to control the luminance and color of the liquid crystal display device. In the instant embodiment, the sustaining duration of each high/low level of the drive voltage of the pixel electrode 30 is $T_0$, which satisfies $t<T_0-t$.

The thin-film transistor T comprises: a source terminal s, a gate terminal g, and a drain terminal d. The source terminal s is electrically connected via the data line S(i) to the source driver 20. The gate terminal g of the thin-film transistor T is electrically connected via the gate line G(i) to the gate driver 10. The drain terminal d of the thin-film transistor T is electrically connected to the pixel electrode 30.

Specifically, the principle of operation is as follows: The liquid crystal display device of the liquid crystal panel drive circuit is activated and the source driver 20 applies, via the thin-film transistor T, a drive voltage to the pixel electrode 30. The drive voltage drives liquid crystal molecules to rotate. The drive voltage comprises a plurality of high levels that is not all identical and a plurality of low levels that is not all identical for controlling the luminance and color of the liquid crystal display device. During the process, the timing controller 50 controls conduction of the compensation unit 60 at the time that is spaced from a falling edge of each high level or a rising edge of low level by the charging time of the compensation capacitor $C_0$ according to the drive voltage of the pixel electrode 30, the compensation unit 60 discharging after being charged, and also controls cutoff of the compensation unit 60 after lapse of the discharging time of the compensation capacitor $C_0$ according to the drive voltage of the pixel electrode 30. In this way, compensation is made on the drive voltage of the pixel electrode 30, making the transition thereof smoother.

The timing controller 50 is electrically connected to the pixel electrode 30, whereby when the drive voltage of the pixel electrode 30 changes, such as changing from high level to low level or from low level to high level, the timing controller 50 is triggered to start time counting and conducts the compensation unit 60 on at time $T_0-t$ to charge the compensation capacitor $C_0$. Afterwards, when the drive voltage of the pixel electrode 30 changes again, the timing controller 50 starts time counting and cuts off the compensation unit 60 at time t and further conducts the compensation unit 60 on at time $T_0-t$ so as to repeat the operation on the compensation capacitor $C_0$.

It is noted that applying the method to drive the liquid crystal molecules to rotate can also increase the drive voltage of the pixel electrode 30 so as to further speed up the rotation of the liquid crystal molecules and shorten the response time.

In summary, the present invention provides a method for speeding up rotation of liquid crystal molecule, which makes compensation on the drive voltage of a pixel electrode by arranging a compensation capacitor so as to make the waveform of the drive voltage of the pixel electrode smoother and avoid abruption change of transmittance, whereby a liquid crystal display device uses such a method can have a smooth transition from black to halftone and can also increase the drive voltage, shorten response time, and enhance quality of the liquid crystal display device. A liquid crystal panel drive circuit according to the present invention increases rotation and restoration speeds of the liquid crystal molecules, shortens response time, makes a smooth process of transition from black to halftone, avoids abrupt change of transmittance, and enhances quality of the liquid crystal display device.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A method for speeding up rotation of liquid crystal molecule, comprising the following steps:
   (1) providing a liquid crystal display device, wherein the liquid crystal display device comprises: a glass substrate, a color filter arranged parallel to the glass substrate, and a quid crystal material arranged between the glass substrate and the color filter, the liquid crystal material comprising liquid crystal molecules and a photo- or thermal-polymerizable polymer; and the glass substrate comprises a liquid crystal panel drive circuit formed thereon, the liquid crystal panel drive circuit comprising: a gate driver, a source driver, a timing controller, a plurality of gate lines and a plurality of data lines, the plurality of gate lines and the data line defining a plurality of pixel units, each of the pixel units comprising a thin-film transistor, a common electrode, a pixel electrode electrically connected to the thin-film transistor, a compensation unit, and a storage capacitor, the thin-film transistor being respectively and electrically connected to the gate driver and the source driver via the gate lines and the data lines, the common electrode and the pixel electrode forming a liquid crystal capacitor, the storage capacitor being connected in parallel to the liquid crystal capacitor, the compensation unit having an end electrically connected to the pixel electrode, the compensation unit comprising: a compensation capacitor, an electrical switch, and an electrical inductor, the compensation capacitor having an end connected to the pixel electrode and an opposite end electrically connected to the electrical switch, the electrical switch having another end electrically connected to the electrical inductor, whereby the compensation unit, once conducted on, electrically charges the compensation capacitor, the timing controller being electrically connected to the compensation unit and the pixel electrode;
   (2) calculating charging/discharging time of the compensation capacitor according to parameters of the compensation capacitor and the formula $t=RC*\ln[(V1-V0)/(V1-Vt)]$, in which R is equivalent resistance, C is capacitance, V1 is the final voltage level of the charging or discharging operation of the capacitor, Vt is the voltage level of the capacitor at the time t, and V0 is initial voltage level of the capacitor;
   (3) activating the liquid crystal display device, wherein the source driver applies, via the thin-film transistor, the drive voltage to the pixel electrode, the drive voltage being applied to drive the liquid crystal molecules to rotate, the drive voltage comprising a plurality of high levels that is not all identical and a plurality of low levels that is not all identical; and
   (4) the timing controller controlling conduction of the compensation unit at the time that is spaced from a falling edge of each high level or a rising edge of low level by the charging time of the compensation capacitor according to the drive voltage of the pixel electrode of Step (3), the compensation unit discharging after being charged, and also controlling cutoff of the compensation unit after lapse of the discharging time of the compensation capacitor according to the drive voltage of the pixel electrode.

2. The method for speeding up rotation of liquid crystal molecule as claimed in claim 1, wherein the thin-film transistor comprises: a source terminal, a gate terminal, and a drain terminal, the source terminal being electrically connected via the data line to the source driver.

3. The method for speeding up rotation of liquid crystal molecule as claimed in claim 2, wherein the gate terminal of the thin-film transistor is electrically connected via the gate line to the gate driver, the drain terminal of the thin-film transistor being electrically connected to the pixel electrode.

4. The method for speeding up rotation of liquid crystal molecule as claimed in claim 1, wherein the compensation capacitor has capacitance that is less than sum of capacitances of the storage capacitor and the liquid crystal capacitor.

5. A method for speeding up rotation of liquid crystal molecule, comprising the following steps:
   (1) providing a liquid crystal display device, wherein the liquid crystal display device comprises: a glass substrate, a color filter arranged parallel to the glass substrate, and a quid crystal material arranged between the glass substrate and the color filter, the liquid crystal material comprising liquid crystal molecules and a photo- or thermal-polymerizable polymer; and the glass substrate comprises a liquid crystal panel drive circuit formed thereon, the liquid crystal panel drive circuit comprising: a gate driver, a source driver, a timing controller, a plurality of gate lines and a plurality of data lines, the plurality of gate lines and the data line defining a plurality of pixel units, each of the pixel units comprising a thin-film transistor, a common electrode, a pixel electrode electrically connected to the thin-film transistor, a compensation unit, and a storage capacitor, the thin-film transistor being respectively and electrically connected to the gate driver and the source driver via the gate lines and the data lines, the common electrode and the pixel electrode forming a liquid crystal capacitor, the storage capacitor being connected in parallel to the liquid crystal capacitor, the compensation unit having an end electrically connected to the pixel electrode, the compensation unit comprising: a compensation capacitor, an electrical switch, and an electrical inductor, the compensation capacitor having an end connected to the pixel electrode and an opposite end electrically connected to the electrical switch, the electrical switch having another end electrically connected to the electrical inductor, whereby the compensation unit, once conducted on, electrically charges the compensation capacitor, the timing controller being electrically connected to the compensation unit and the pixel electrode;
   (2) calculating charging/discharging time of the compensation capacitor according to parameters of the compensation capacitor and the formula $t=RC*\ln[(V1-V0)/(V1-Vt)]$, in which R is equivalent resistance, C is capacitance, V1 is the final voltage level of the charging or discharging operation of the capacitor, Vt is the voltage level of the capacitor at the time t, and V0 is initial voltage level of the capacitor;

(3) activating the liquid crystal display device, wherein the source driver applies, via the thin-film transistor, the drive voltage to the pixel electrode, the drive voltage being applied to drive the liquid crystal molecules to rotate, the drive voltage comprising a plurality of high levels that is not all identical and a plurality of low levels that is not all identical; and (4) the timing controller controlling conduction of the compensation unit at the time that is spaced from a falling edge of each high level or a rising edge of low level by the charging time of the compensation capacitor according to the drive voltage of the pixel electrode of Step (3), the compensation unit discharging after being charged, and also controlling cutoff of the compensation unit after lapse of the discharging time of the compensation capacitor according to the drive voltage of the pixel electrode; and wherein the thin-film transistor comprises: a source terminal, a gate terminal, and a drain terminal, the source terminal being electrically connected via the data line to the source driver;

wherein the gate terminal of the thin-film transistor is electrically connected via the gate line to the gate driver, the drain terminal of the thin-film transistor being electrically connected to the pixel electrode; and wherein the compensation capacitor has capacitance that is less than sum of capacitances of the storage capacitor and the liquid crystal capacitor.

* * * * *